3,340,212
ELECTRICAL INSULATING RESIN COMPOSITION OF EPOXY RESIN, ACID-TERMINATED POLYESTER AND STANNOUS OCTOATE

Jun Tomita, St. Paul, Minn., assignor to Minnesota Mining and Manufacturing Company, St. Paul, Minn., a corporation of Delaware
No Drawing. Filed Nov. 9, 1961, Ser. No. 151,204
7 Claims. (Cl. 260—22)

This invention relates to epoxy resin compositions which are useful in a variety of applications but are primarily intended for electrical insulating uses. For the most part, the novel compositions cure to a flexible or elastomeric state, but the ingredients may, if desired, be so selected that the cured products are properly classed as rigid resins.

Epoxy resins are attaining a dominant position in the electrical industry as casting resins, saturants for paper or fabric as insulating tape or sheeting, insulating coatings for wires or tubing, preformed insulating films, and the like. For such uses, it is generally necessary that the cured resinous product be flexible and elastic, but as compared to rigid cured epoxy resin compositions, increased flexibility in the cured product has always been accompanied by some sacrifice in other important qualities.

The best flexible electrical insulating resin on the market prior to the present invention is, in the opinion of the inventor, the epoxy resin composition disclosed in the copending application of Kurt A. Kurka and Herbert M. Bond, Ser. No. 834,407, filed Aug. 18, 1959, now U.S. Patent 3,027,279. That composition comprises a mixture of epoxy resin and certain acid-terminated, branched-chain polyesters, and may or may not include a catalyst. Flexible cured products of the Kurka and Bond application can withstand severe mechanical and thermal shock; are resistant to water, organic solvents, transformer oils, etc.; have high strength over a wide range of temperatures; and age well under conditions of use, even though exposed to rather high temperatures for prolonged periods. However, the uncatalyzed heat-curable compositions cure too slowly for some important uses, whereas cured products of the catalyzed compositions of the working examples of the Kurka and Bond application have substantially decreased electrical insulating values during exposure to high temperatures.

The present invention is in the nature of an improvement in the Kurka and Bond invention inasmuch as it concerns the discovery that by selecting a certain catalyst not named in the Kurka and Bond application, mixtures of epoxy resin and acid-terminated polyesters cure very rapidly at temperatures of 175° C. and above to provide cured products having excellent electrical insulating values over a wide range of temperatures, which values remain effectively high after long exposure at high temperatures. The catalyzed mixtures can be stored for periods of up to a month or more at ordinary room temperature and then be used to provide cured products of quality equal to products of a freshly prepared composition. The special catalyst of this invention is a stannous soap of saturated aliphatic acids of about 4 to 12 carbon atoms, preferably stannous octoate. Furthermore, when using the stannous soap as catalyst, tough strong cured epoxy resin products can be obtained even when the acid-terminated polyester is not branched.

The acid-terminated polyester of the novel epoxy resin composition is a polyester of polycarboxylic acid and polyhydroxy alcohol and contains a calculated average of 2.0 to 3.0 carboxyl groups per molecule and has an acid number of about 15–125 and a hydroxyl number of less than 10. Preferably, the skeletal chain is essentially free from ethylenic unsaturation which would otherwise deleteriously affect the resistance to deterioration of the cured insulating resin. The polyester will not gel when heated in the absence of air. It is desirable that its skeletal chain be essentially free from ether oxygen, the presence of which tends to make the cured products of the invention less resistant to moisture and thus less resistant to electrical breakdown, although the effect is minor if the ether oxygen is directly attached to an aromatic ring. Especially preferred are branched-chain polyesters of dicarboxylic acid, dihydroxy alcohol and a polyfunctional compound selected from the class consisting of polyhydric alcohols having at least three non-tertiary hydroxyl groups and polybasic acids having at least three carboxyl groups.

The hydroxyl number of polyester should not exceed 10 and preferably is less than 5. A larger hydroxyl number indicates incomplete reaction between the acid and alcohol components of the polyester, in which event the products of reaction with the epoxy resin are of relatively poor quality. It is especially important that the hydroxyl number be low when the calculated average number of carboxyl groups in the polyester approaches 2.0.

When the polyester is linear or has an average of only 2.1 or 2.2 carboxyl groups per molecule, it is preferred that its acid number be about 30–100. When the polyester is branched and has an average of about 3.0 carboxyl groups per molecule, it is prefered that its acid number be about 15–60. At acid numbers below these preferred ranges, the rate of reaction may be slow and the reaction product might not be fully cured to a tough, infusible, insoluble state, even if heated for a long period. If the acid number is above these preferred ranges, the cured product may be harder and less flexible than is desired for many purposes.

In applications for which the compositions of this invention are primarily intended, it is preferred that the acid-terminated polyester include an average of 2.2 or more carboxyl groups since it is thus possible to obtain cured products of greater flexibility and elasticity. Moreover, at higher degrees of carboxyl functionality, a lesser weight proportion of the composition comprises epoxy resin, which at the present time is more expensive than the polyester, and in some cases the use of relatively highly branched polyesters has resulted in better thermal stability of cured product. Also, such compositions tolerate larger proportions of reinforcing fillers which tend to improve strength and toughness of cured product. If the polyester is prepared using trifunctional acid or alcohol, the calculated average number of carboxyl groups should not exceed about 3.0, or the polyester tends to gel prematurely to an unusuable state. When tetrafunctional acid or alcohol is used, the calculated average number of carboxyl groups should not exceed about 2.3 if premature gelation is to be avoided.

The other essential ingredient of the electrical insulating composition of this invention is an epoxy resin which contains about 1.3 or more oxirane groups per average molecular weight. Particularly useful are liquid polyglycidyl ethers of polyhydric phenols such as resorcinol or bisphenol A which usually have slightly less than 2.0 oxirane groups per average molecular weight, but sometimes have more than 2.0 oxirane groups. For example, polyglycidyl ethers of phenol-formaldehyde novolaks (e.g., "Epiphen 849") having 2.5 to 3 oxirane groups per average molecular weight are useful in this invention. Also useful is the epoxy resin "Epon 1310" which is the condensation product of 1,1,2,2-tetrakis(4-hydroxyphenyl)ethane and epichlorhydrin having an average of about three glycidyl ether groups in the molecule. Another epoxy resin which has provided excellent electrical insulation in the practice of this invention is the liquid alicyclic epoxy resin of the formula

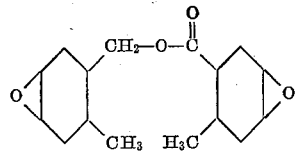

such as the resin presently marketed as "Unox–201" and formerly marketed as "EP–201."

Other useful monomeric epoxy resins include limonene dioxide, dicyclopentadiene dioxide, vinylcyclohexene dioxide and 3,4-epoxy-6-methylcyclohexylmethyl-3,4-epoxy-6-methylcyclohexanecarboxylate.

When the calculated functionality of the acid-terminated polyester is 2.5 or more carboxyl groups per average molecule and it is desired to obtain cured products of especially high flexibility, monoepoxides may be blended in the novel epoxy resin composition in amounts up to about equal molar ratio with the epoxy resin, but not in such large amounts that the blend does not readily cure to a strong, tough state. Typical useful monoepoxides are dodecene oxide, octylene oxide, dipentene monoxide, alpha-pinene oxide, styrene oxide, phenyl glycidyl ether, vinylcyclohexene monoxide and epoxidized long-chain olefins, e.g., of 16–18 carbon atoms.

The novel epoxy resin composition preferably contains approximately 0.7 to 1 epoxy group of epoxy resin per carboxyl group of polyester, but excellent results have been attained with as little as 0.5 epoxy group and as much as 2.0 epoxy groups per carboxyl group. At least 0.2 part by weight and preferably at least 1.0 part of the stannous soap catalyst should be present per 100 parts of polyester if the composition is to cure fully in a short time, and the time of cure is shortened with increased amounts of the catalyst up to 2 parts. Above this amount, the speed of cure is not further enhanced, although as much as 6 parts of the catalyst have been used with little or no effect on the stability of the composition at room temperature and with no substantial loss of quality in the cured product.

The novel compositions may also include inorganic fillers such as ground mica, slate or calcium carbonate, reinforcing fillers such as silica or carbon black, diluents such as liquid chlorinated diphenyl, and pigments. When fillers are used, it is especially preferred that the epoxy resin be a polyglycidyl ether of polyhydric phenol.

Preparation and properties of typical acid-terminated polyesters having utility in the present invention are described below.

POLYESTER A

This polyester was formed by the hot melt fusion process in an inert atmosphere using a three-neck glass flask fitted with stirrer, thermometer, gas inlet tube and barret trap. The flask was charged with 1516.8 grams (7.5 mols) of sebacic acid, 700 grams (6.74 mols) of neopentyl glycol, 19.8 grams (0.147 mol) of trimethylolpropane and 3.0 grams triphenyl phosphite catalyst. The reaction mixture was heated for 4 hours under nitrogen, during which time the temperature gradually increased from 150° C. to 170° C. and 80% of the theoretical water of condensation was removed. Further heating at 200° C. and 10 mm. Hg pressure for an additional 8 hours provided an acid-terminated polyester having an acid number of 31.5, a calculated number average degree of polymerization of about 29, a calculated number average molecular weight of about 4000, and a calculated functionality of about 2.3 carboxyl groups per average molecule.

POLYESTER B

To a charge of 2420 pounds of propylene glycol in a 2000-gallon Dowtherm reactor was added with agitation 4100 pounds of adipic acid and 1680 pounds of isophthalic acid followed by 320 pounds of trimethylol propane and 5760 grams of triphenyl phosphite. The reactor was sealed and the temperature was raised to 220° C. Water of condensation was removed by a stream of nitrogen. When the acid number reached 80, a vacuum was applied with continued heating until the acid number was reduced to 55. The polyester product had a calculated number average molecular weight of about 3000, a calculated number average degree of polymerization of about 20, a measured hydroxyl number of about 5, and contained a calculated average of 3.0 carboxyl groups per molecule.

POLYESTER C

A mixture of 93.6 grams (1.8 mols) of neopentyl glycol and 202.2 grams (2.0 mols) of sebacic acid was reacted as described in the preparation of Polyester A to an acid number of 42.0. The calculated number average degree of polymerization was about 19, the calculated number average molecular weight about 2700, and the calculated functionality was 2.0 carboxyl groups per average molecule.

POLYESTER D

This polyester was prepared in the manner of Polyester A using 101.12 grams (0.5 mol) sebacic acid, 3.38 grams (0.025 mol) trimethylolpropane, 42.2 grams (0.293 mol), 2,2,4-trimethylpentane diol-1,3, and 13.05 grams (0.125 mole) neopentyl-glycol. It had an acid number of 34.0, a calculated number average degree of polymerization of about 30, a calculated number average molecular weight of about 4500, and a calculated functionality of about 2.8 carboxyl groups per average molecule.

POLYESTER E

A 170-gallon stainless steel kettle equipped with a cooled column packed with beryl saddles leading to a condenser was charged with 579 pounds of adipic acid, 355.3 pounds of diethylene glycol, 20.75 pounds of trimethylolpropane and 894 grams of triphenyl phosphite. The temperature was slowly raised using a heated oil bath to 200° C. and maintained until 85% of theoretical water of condensation was removed by a stream of nitrogen. A vacuum was then applied as boiling would permit with continued heating until the acid number was 53. This polyester product had a calculated number average degree of polymerization of about 29, a calculated number average molecular weight of about 2100, and a calculated functionality of about 2.5 carboxyl groups per average molecule.

POLYESTER F

This polyester was formed by the hot melt fusion process in an inert atmosphere using a three-neck glass flask fitted with stirrer, nitrogen inlet, thermometer and barret trap connected to a steam-jacketed column packed with glass helices. The flask was charged with 404.5 grams (2.0 mols) of n-sebacic acid, 241.5 grams (1.748 mols) of para-xylene glycol, and 8.6 grams (0.0635 mol) of trimethylolpropane. The reaction mixture was heated for 18.5 hours at temperatures up to 231° C., followed by heating at 212° C. and 8 mm. Hg pressure for an additional 32 hours. The product polyester had an acid number of 37, a calculated degree of polymerization of 30, a calculated number average molecular weight of about 3800, and contained about 2.5 carboxyl groups per molecule. Its melting point was 84–85° C.

Illustrative compositions of the present invention are described in the following examples, in the first of which is employed a typical epoxy resin which is marketed commercially as "Epon 828." This resin in a condensation product of epichlorhydrin and bisphenol A, has a Durrans' softening point of about 10° C. and an epoxide equivalent of about 190. The specific catalyst used in the examples was "Catalyst T–9," a product of Metal & Thermit Co., which is a mixture of stannous soaps predominantly stannous octoate.

Example I

One hundred grams (about 0.06 carboxyl equivalent) of Polyester A, 12 grams (about 0.06 oxirane equivalent) of said epoxy resin, 2 grams of stannous octoate, and 15 grams of silica powder ("Cab-O-Sil") were mixed together on a 3-roll mill. The mixture was subjected to a vacuum to draw off air introduced in milling. The resulting viscous liquid was cast as a 0.06-inch thick sheet and cured for one hour at 220° C. The flexible, tack-free cured sheet had the following electrical characteristics when measured at 100 cycles per second at the indicated temperatures:

|  | Temp. of Measurement | | |
|---|---|---|---|
|  | 30° C. | 105° C. | 150° C. |
| Dissipation Factor, Percent | 0.5 | 7.5 | 23.2 |
| Dielectric Constant, Percent | 5.5 | 4.9 | 5.3 |

In addition to having these excellent electrical insulating characteristics both at low and high temperatures, the unreinforced film exhibited good resistance to water, oils and organic solvents. It had a tensile strength of 738 p.s.i. with an elongation at break of 231%, the measurement being made with a ⅛-inch strip (ASTM D-638-58T) on the Instron Tensile Tester at an initial jaw separation of one inch and a crosshead speed of two inches per minute. It is preferred for most electrical insulating purposes that the composition of this example be reinforced, e.g., be used as a saturant for woven or nonwoven fabric such as glass cloth.

For such use, the composition of this example was dissolved in toluene to 40% solids and coated on both sides of 4-mil thick woven glass cloth (heat cleaned—style No. 116). Then after heating for 30 minutes at 205° C., the web was again coated on both sides and reheated 30 minutes at 205° C. to provide a dense flexible web 0.010 inch in thickness, the electrical characteristics of which were:

|  | Temp. of Measurement | | |
|---|---|---|---|
|  | 30° C. | 105° C. | 150° C. |
| Dissipation Factor, Percent | 0.2 | 8.3 | 43.0 |
| Dielectric Constant, Percent | 6.5 | 5.7 | 7.3 |

Braided fibrous glass having a diameter of 0.25 inch (A.W.G. size No. 12) was passed through a container of solvent-free, heat-curable resin composition of this example, thence through a metering die and held in front of heat lamps for about 14 minutes at an effective temperature of about 240° C. to provide a cured resin covering over the braided glass tube of about 0.012 inch. Its dielectric strength was 950 volts per mil (ASTM D-876-58T, section 46). Samples of the cured tube retained 50% of the dielectric strength after exposure to 220° C. for 12 days, or after exposure to 200° C. for 44 days. These values evidence good electrical insulating properties and excellent thermal stability.

The solvent-free composition of this example is also useful for insualting stranded lead-in wire for motors which have high operating temperatures, e.g., 155° C.

Example II

In a 2000-gallon Dowtherm reactor, 1330 pounds of "Epon 828" epoxy resin were added with agitation to 7125 pounds of Polyester B (providing about one oxirane group of epoxy resin for each carboxyl group of polyester) with sufficient toluene to provide 90% solids. Reaction was carried out under reflux at 160° C. until the Brookfield viscosity of the reaction mixture was 140,000 cps. at 60° C. The mixture was then cooled to 120° C., toluene added to dilute to 80% solids, and mixing was continued for an additional 30 minutes.

To 100 parts by weight of this solution were added 15 parts of "Epon 828" epoxy resin, 2 parts stannous octoate and sufficient toluene to provide a solution of 45% solids which was applied to both sides of woven glass cloth (heat cleaned—style No. 125) followed by heating for 5 minutes at 100° C. and 15 minutes at 220° C. A second identical coating and drying-curing cycle was carried out to provide a dense, flexible cured resinous web of 0.007-inch total thickness. Electrical characteristics of the freshly cured web, as well as of samples of the web after exposure to 210° C. for 4 days and for 10 days, were as follows:

|  | Temp. of Measurement | | |
|---|---|---|---|
|  | 30° C. | 105° C. | 150° C. |
| Dissipation Factor, Percent | 3.3 | 18.1 | 31.5 |
| Percent after 4 days at 210° C | 1.1 | 5.1 | 31.1 |
| Percent after 10 days at 210° C | 0.3 | 1.5 | 5.7 |
| Dielectric Constant, Percent | 6.6 | 6.8 | 9.2 |
| Percent after 4 days at 210° C | 6.6 | 6.9 | 7.2 |
| Percent after 10 days at 210° C | 7.0 | 6.4 | 6.2 |

These measurements are exemplary of the superior thermal stability of cured resinous products of this invention.

The dielectric strength at 25° C. of the freshly cured web measured while drawn over a curved electrode of 0.5-inch radius was 1300 volts per mil. Then after exposure to 210° C. for 10 days, the dielectric strength at 25° C. was 1100 volts per mil. Surface resistivity (ASTM D-257-58) at 130° C. of the freshly cured web was $6.6 \times 10^{12}$ ohms per square, an exceedingly high value for a flexible resin at this temperature.

Example III

A mixture of 10 grams of the unbranched Polyester C (0.0075 carboxyl equivalent), 0.67 gram of "Epon 828" (about 0.00375 oxirane equivalent), 1.5 grams of silica powder, and 0.2 gram stannous octoate was cast as a 0.04-inch thick sheet and cured for 45 minutes at 205° C. The cured sheet was soft and stretchy and was slightly tacky but was insoluble in toluene or methyl ethyl ketone. Its tensile strength (measured as in Example I) was 613 pounds per square inch with a break elongation of 300%. Electrical characteristics were:

|  | Temp. of Measurement | | |
|---|---|---|---|
|  | 30° C. | 105° C. | 150° C. |
| Dissipation Factor, Percent | 0.4 | 6.0 | 63.8 |
| Dielectric Constant, Percent | 5.4 | 4.7 | 6.5 |

Example IV

A mixture of Polyester D and "Epon 828" containing about one carboxyl group of polyester per oxirane group of epoxy resin and two parts by weight of stannous octoate per 100 parts of polyester was cast as a 0.06-inch thick sheet and cured for one hour at 205° C. The flexible cured sheet had a dielectric strength of 1000 volts per mil at 25° C. and also had the following electrical characteristics:

|  | Temp. of Measurement | | |
|---|---|---|---|
|  | 30° C. | 105° C. | 150° C. |
| Dissipation Factor, Percent | 0.4 | 10.4 | 38.8 |
| Dielectric Constant, Percent | 6.2 | 4.8 | 5.0 |

Example V

| | Parts by weight |
|---|---|
| Polyester E | 100 |
| Silica powder | 25 |
| Titanium dioxide | 20 |
| Epoxy resin ("EP–201") | 16 |
| Stannous octoate | 1.5 |
| Antioxidant ("Stalite S") | 0.5 |
| Ethyl zimate | 0.5 |
| Carbon black | 0.55 |
| Chrome oxide pigment | 0.23 |

After all of the ingredients except the epoxy resin and stannous octoate were milled together, these were added and toluene was added to produce a solution containing 70% solids. This was knife-coated to saturate fabric woven of tensilized polyethylene terephthalate fibers and having a weight of 90.8 grams per square yard. The coated fabric was cured at 175° C. for 30 minutes to provide a strong, flexible sheet 9 mils in thickness.

The cured sheet showed no exposure after 100 cycles on the Tabor abrader with a CS–17 wheel, 1000 gram load. When tested for low temperature flexibility (Mil C–20696), the cured web did not crack at −51° C. Tear strength (Federal Specification, Textile Test Method CC–T–191b Method 5134) was 10 pounds in the warp direction and 9 pounds in the fill direction.

Electrical insulating properties of this cured resin composition are not comparable to the exceedingly high values of cured resin compositions of the preceding examples. However, the composition of this example lends superior abrasion resistance, good weather resistance, good solvent resistance, and low hydrocarbon-vapor permeability to fabrics such as nylon, "Dacron," cotton, paper and fiber glass.

Example VI

Used in this example was a solid epoxy resin condensation product of epichlorhydrin and bisphenol A having a Durrans' softening point of about 80° C. and an epoxide equivalent of 550–700, specifically "Epon 1002," and a small amount of a prereacted product of 30 parts of such an epoxy resin and 10 parts of melamine-formaldehyde resin. After 632 grams of the "Epon 1002," 40 grams of the prereacted epoxy-melamine resin and 6 grams of stannous octoate were mixed on a heated rubber mill for a short time, the mixture was removed, cooled and ground to a fine powder. A mixture of 124 grams of this powder and 276 grams of powdered Polyester F was screened to pass 100 mesh and suspended within a container having a porous false bottom by means of air moving upwardly through the false bottom. No. 8 aluminum wire was preheated to 205° C. and plunged momentarily within the air-suspended particles to collect a covering of coalesced particles, withdrawn, and placed in an oven for 2 hours at 205° C. to cure the covering which had a thickness of about 0.004 inch. The wire was thus provided with a highly flexible electrical insulation of high quality and was bent around a ¼-inch mandrel without cracking.

Among dicarboxylic acids other than those disclosed above which can be used in making acid-terminated polyesters useful in the present invention are o-phthalic acid, azelaic acid, and chlorendic anhydride. Among other dihydroxy alcohols are 1,4-butane diol, ethylene glycol, cyclohexanedimethanol, and 2,2-bis[4-(2-hydroxy-propoxy)phenyl]propane. In addition to trimethylolpropane as the polyfunctional compound, glycerol and pentaerythritol and polycarboxylic acids such as trimesic acid, citric acid, trimellitic acid, benzene tetracarboxylic acid and tricarballylic acid also have utility.

The novel resin compositions of this invention are especially useful as electrical insulating tapes in which the compositions are used to saturate woven and nonwoven fabrics such as glass cloth, mica paper and polyethylene terephthalate mat. Normally the resin composition is cured or partially cured immediately after impregnation of the fabric, after which the fabric is slit to desired widths and wound up into roll form for storage. In some cases, it is desirable to apply a pressure-sensitive adhesive coating to the tape after the curing cycle and before it is wound up. Temperatures in the range of about 150–250° C. have been used with good results in curing the resin. Exposure to air facilitates the speed of cure.

Another important use of the novel resin compositions is for the encapsulation or coating of electrical equipment such as motors, transformers and electric circuits. In such use, free-flowing liquid, solvent-free compositions such as that of Example I are preferred.

What is claimed is:

1. A heat-curable epoxy resin composition which provides cured products having excellent electrical insulating values over a wide range of temperatures, which values remain effectively high after long exposure at high temperatures, said composition comprising a mixture of (1) an acid-terminated polyester of polycarboxylic acid and polyhydroxy alcohol, which polyester contains a calculated average of 2.0 to 3.0 carboxyl groups per molecule and has an acid number of 15–125 and a hydroxyl number of less than 10, (2) an epoxy resin containing at least 1.3 oxirane groups per average molecular weight, and (3) at least 0.2 part, per 100 parts of polyester, of stannous octoate, said mixture containing about 0.5 to 2 epoxy groups of epoxy resin per carboxyl group of polyester.

2. A fibrous web saturated by the heat-curable epoxy resin composition of claim 1.

3. The heat-cured resinous product of claim 1.

4. Wire electrically insulated by a heat-cured coating of the composition of claim 1.

5. A heat-curable electrical-insulating resin composition which provides cured products having excellent electrical insulating values over a wide range of temperatures, which values remain effectively high after long exposure at high temperatures, said composition comprising a mixture of (1) a branched-chain, acid-terminated polyester of dicarboxylic acid, up to 20 mol percent of which contains aromatic rings, dihydroxy aliphatic alcohol and a polyhydric alcohol having at least three nontertiary hydroxyl groups, which polyester contains an average of 2.1 to 3.0 carboxyl groups per molecule, has an acid number of 15–100, a hydroxyl number of less than 5, is free from ethylenic unsaturation in its skeletal chain, and is free from ether oxygen other than oxygen attached directly to an aromatic ring, (2) an epoxy resin containing about 2 oxirane groups per average molecular weight, which epoxy resin is a polyglycidyl ether of a polyhydric phenol, and (3) 1–2 parts of stannous octoate per 100 parts of polyester, said mixture containing 0.5 to 2 epoxy groups of epoxy resin per carboxyl group of polyester.

6. A solution of the heat-curable resin composition of claim 5 of which said polyester and epoxy resin comprise at least 50% by weight.

7. The method of making a tough, thermally-stable cured resinous product comprising the steps of (a) mixing together (1) an acid-terminated polyester of polycarboxylic acid and polyhydroxy alcohol, which polyester contains a calculated average of 2.0 to 3.0 carboxyl groups per molecule and has an acid number of 15–125 and a hydroxyl number of less than 10, (2) an epoxy resin containing at least 1.3 oxirane groups per average molecular weight and being present in an amount such that the mixture contains about 0.5 to 2 epoxy groups of epoxy resin per carboxyl group of polyester, and (3) at least 0.2 part, per 100 parts of polyester, of stannous octoate, and (b) heating the mixture at a temperature of 150°–250° C. to provide a cured product.

(References on following page)

References Cited

UNITED STATES PATENTS

| | | | |
|---|---|---|---|
| 2,933,459 | 4/1960 | Gurgiolo | 260—2 |
| 3,027,279 | 3/1962 | Kurka et al. | 117—232 |
| 3,201,360 | 8/1965 | Proops et al. | 260—18 |
| 3,208,955 | 9/1965 | Proops | 260—18 |

DONALD E. CZAJA, *Primary Examiner.*

MILTON STERMAN, LEON J. BERCOVITZ,
*Examiners.*

J. W. BEHRINGER, R. W. GRIFFIN,
*Assistant Examiners.*